United States Patent
Tam et al.

(10) Patent No.: US 7,514,499 B2
(45) Date of Patent: Apr. 7, 2009

(54) RING OPENING POLYMERIZATION OF CYCLIC AMIDES USING N-HETEROCYCLIC CARBENE CATALYSTS

(75) Inventors: Wilson Tam, Boothwyn, PA (US); David T. Williamson, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 609 days.

(21) Appl. No.: 11/270,762

(22) Filed: Nov. 9, 2005

(65) Prior Publication Data
US 2006/0100365 A1    May 11, 2006

Related U.S. Application Data

(60) Provisional application No. 60/626,188, filed on Nov. 9, 2004.

(51) Int. Cl.
*C08K 3/02* (2006.01)
(52) U.S. Cl. .......... 524/701; 524/779; 524/789; 528/314
(58) Field of Classification Search .......... 524/701, 524/779, 789; 528/314
See application file for complete search history.

(56) References Cited

FOREIGN PATENT DOCUMENTS

WO    WO 2004/060987 A2    7/2004

OTHER PUBLICATIONS

N. Heterocyclic Carbenes, Walfgang Herrmann et al., Chem.Int.Ed. Engl. 1997, pp. 2163-2187.
Expanding the Catalytic Activity . . . Reactions, Gregory Nyce et al., pp. 3587-3490, American Chemical Socienty, 2002.
Extending the Reactivity of N-Heterocyclic . . . Monomers, Polymer Preprints 2004, pp. 902.
JACS Articles, In Situ Generation . . . Polymerization, pp. 3046-3056, 2003.
Ruthermium Carbene . . . Extended Scope, J. Org. Chem. 2000, 65, pp. 2204-2207.
Synthesis and ring-opening . . . monomers, J. Baran, Journal of Molecular Catalysts, pp. 109-115.
Polymer Journal, Synthesis of High Molecular Weight . . . Caprolactam, Ueda pp. 446-451.
Macromolecules, Poly(aminophosphazene)s . . . Lactams, Memeger, pp. 6475-6480.
Polymer vol. 38, "Polyamides from Lactams . . . Findings", Udipi, pp. 927-938.
Derwent Abstract, J63277659, Mitsubishi Monsanto Kk.
Patent Abstracts of Japan, Publ. No. 59100134, Ube Ind. Ltd.

*Primary Examiner*—Edward J Cain

(57) ABSTRACT

N-heterocyclic carbenes are effective catalysts for the ring opening polymerization of cyclic amides. The catalysts provide rapid polymerization, high monomer conversion, high molecular weight, and a mechanically sound material.

25 Claims, No Drawings

RING OPENING POLYMERIZATION OF CYCLIC AMIDES USING N-HETEROCYCLIC CARBENE CATALYSTS

This application claims the benefit of U.S. Provisional Application No. 60/626,188, filed Nov. 9, 2004, which is incorporated in its entirety as a part hereof for all purposes.

TECHNICAL FIELD

This invention relates to the ring opening polymerization of cyclic amide compositions. More particularly, it relates to a genus of catalysts for such polymerizations that provide rapid polymerization with high monomer conversion, producing high molecular weight, mechanically sound polymer.

BACKGROUND

Ring opening polymerization of lactams is an important route to commercial polyamides such as nylon 6 and nylon 12. Initially, nylon 6 was produced by the ring-opening polymerization ("ROP") of ε-caprolactam in the presence of small amounts of acid or water. Subsequently, anionic ROP was preferred, typically with sodium lactamate salt catalysts and isocyanate/lactam adducts as initiators. Grignard salts of ε-caprolactam have also been used as catalysts for ROP of lactams [(K. Ueda et al., *Polymer Journal* (1996), 28(5), 446-451)], as have poly(aminophosphazenes) and protophosphatranes [(W. Memeger, Jr. et al., *Macromolecules* (1996), 29, 6475-6480)]. More information about the production of polyamides from anionic ROP of lactams is available in a variety of sources that include, for example, H. Sekiguchi, "Lactams and Cyclic Imides," in *Ring-Opening Polymerization*, K. J. Ivin and T. Saegusa, eds., Elsevier Applied Science Publishers Ltd., Essex, England, vol. 2 (1984), Ch. 12, 809-918; K. Udipi et al., *Polymer* (1997), 38(4), 927-938; R. S. Davé et al., *Ibid.,* 939-947; R. S. Davé et al., *Ibid.,* 949-954; and J. Sebenda, *Prog. Polym. Sci.* (1978), 6, 123-167.

Macrocyclic amides can be formed as minor byproducts in the production of linear polyamides. For example, when hexamethylene diamine and adipic acid are polymerized to make nylon 66, cyclic species are produced at a level of about 1.5%: cyclic unimer, cyclic dimer, cyclic trimer, and traces of higher cyclic oligomers. Macrocyclic aromatic amides are also known and have been synthesized under dilute reaction conditions. Flexible linkages and kinks increase the propensity to form macrocyclics [W. Memeger, Jr., "Macrocyclic Aramids" in *Polymeric Materials Encyclopedia*, J. C. Salamone editor-in-chief, CRC Press, Inc., Boca Raton, Fla. (1996), 3873-3882].

Linear polyamides may be fabricated into articles of manufacture by a number of known techniques including extrusion, compression molding, and injection molding. However, lactams and macrocyclic amides have unique properties that make them attractive as matrices for engineering thermoplastic composites. The desirable properties stem from the fact that lactams and macrocyclic amides exhibit low melt viscosity, allowing them easily to impregnate a dense fibrous preform followed by polymerization to polyamides. Upon melting and in the presence of an appropriate catalyst, polymerization and crystallization can occur virtually isothermally.

There thus remains a need for an effective and efficient high-temperature process for preparing linear polyamides from cyclic amides.

SUMMARY

One embodiment of this invention is a process for preparing a linear polyamide by contacting at least one cyclic amide with at least one N-heterocyclic carbene-containing catalyst described by the formula:

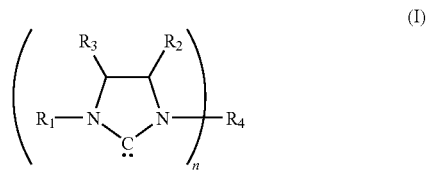

(I)

wherein:
$R_1$ is an adamantyl, alkyl, or cycloalkyl group;
$R_2$ and $R_3$ are each independently hydrogen or a $C_{1-12}$ alkyl group;
n equals 1 or 2; and
$R_4$ equals $R_1$ when n equals 1, and is an alkylene group when n equals 2.

Another embodiment of this invention is a process for preparing a linear polyamide comprising contacting at least one cyclic amide with at least one N-heterocyclic carbene-containing catalyst described by the formula

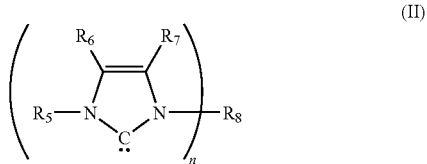

(II)

wherein
$R_5$ is an adamantyl, alkyl, or cycloalkyl group;
$R_6$ and $R_7$ are each independently hydrogen or a $C_{1-12}$ alkyl group;
n equals 1 or 2; and
$R_8$ equals $R_5$ when n equals 1, and is an alkylene group when n equals 2.

A further embodiment of this invention is a process for preparing a linear polyamide comprising contacting at least one cyclic amide with at least one N-heterocyclic carbene containing catalyst described by the formula:

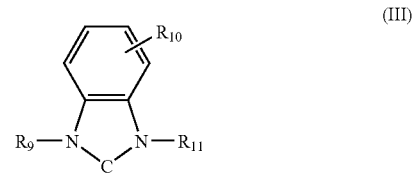

(III)

wherein
$R_9$ and $R_{11}$ are each independently an adamantyl, alkyl, or cycloalkyl group, and
$R_{10}$ is hydrogen or a $C_{1-12}$ alkyl group.

In a further embodiment of this invention, articles are produced using a cyclic amide material (with or without fillers) by polymerizing it in the process of forming the article, using processes including without limitation injection and rotational molding, resin film infusion, resin transfer molding, filament winding, powder coating to create a prepreg or film, hot melt prepreg preparation, compression molding, roll wrapping, and pultrusion; and all of these optionally with reinforcement.

DETAILED DESCRIPTION

In the context of this disclosure, a number of terms shall be utilized.

As used herein, the term "cyclic amide" denotes a cyclic molecule having at least one ring in its molecular structure containing at least one identifiable amide functional repeat unit. The amide functional unit is typically —NH—C(O)— but N-substitution is also possible, with, for example, a $C_{1-12}$ alkyl group. The cyclic amide may be an oligomer.

As used herein, an "oligomer" means a molecule that contains 2 or more identifiable structural repeat units of the same or different formula.

As used herein, the term "N-heterocyclic carbene" denotes a closed ring system containing at least one nitrogen ring atom and a ring atom that is a divalent carbon.

As used herein, the term "adamantyl" means the radical formed by the loss of a hydrogen atom from adamantane ($C_{10}H_{16}$). The 2-isomer is shown below:

As used herein, "an alkyl group" means a univalent group derived from an alkane by removing a hydrogen atom from any carbon atom: —$C_nH_{2n+1}$ where $n \geq 1$.

As used herein, "a cycloalkyl group" means a cyclic alkyl group, —$C_nH_{2n+1-x}$, where x represents the number of H's replaced by cyclization(s).

As used herein, "an alkylene group" means a divalent group —$C_nH_{2n}$— where $n \geq 1$.

As used herein, "a divalent aromatic group" means an aromatic group with links to other parts of the cyclic molecule. For example, a divalent aromatic group may include a meta- or para-linked monocyclic aromatic group. Examples are the meta- and para-phenylene groups,

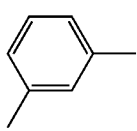

m-phenylene

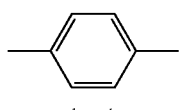

p-phenylene

As used herein, "a polyamide composite" means a polyamide that is associated with another substrate such as a fibrous or particulate material. Illustrative examples of particulate material are chopped fibers, glass microspheres, and crushed stone. Certain fillers and additives thus can be used to prepare polyamide polymer composites. The term "fibrous material" or "fibrous substrate" means a more continuous substrate, e.g., fiberglass, ceramic fibers, carbon fibers or organic polymers such as aramid fibers.

As used herein, "wet-out" means a process to cause a physical state of good and sustained contact between a liquid substrate and a solid substrate such that no substantial amount of air or other gas is trapped between the liquid substrate and the solid substrate.

As used herein, "fiber" means any material with slender, elongated structure such as polymer or natural fibers. The material can be fiberglass, ceramic fibers, carbon fibers or organic polymers such as aramid fibers.

As used herein, a fiber "tow" or "strand" is a group of fibers together, or a bundle of fibers, which are usually wound onto spools and may or may not be twisted.

As used herein, a "fiber preform" is an assembly of fiber tows and/or fabric held together in a desired shape.

As used herein, a "prepreg" is a fiber material, such as carbon, glass or other fiber, that has been impregnated with a resin material in sufficient volume as to provide the matrix of the composite, and such that the ratio of fiber to resin is closely controlled. The fiber configuration can be in tow form, woven or knitted into a fabric, or in a unidirectional tape.

It has been found that compounds containing N-heterocyclic carbene or N-heterocyclic carbene precursor effectively catalyze the ring-opening polymerization of cyclic amides to form linear polyamides. Such catalysts are stable at the temperatures required for polymerization and result in high monomer conversion, high molecular weight, and a mechanically sound material. The polymerization is rapid, with a high degree of conversion possible in five to sixty minutes.

Cyclic amides that may be employed in this invention may be aliphatic or may include one or more divalent aromatic groups, subject to the proviso that the melting point be less than about 260° C.

Suitable aliphatic cyclic amides include, but are not limited to:

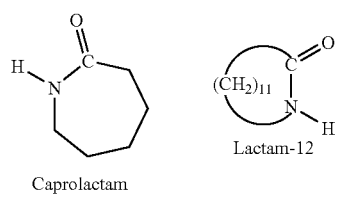

Caprolactam                Lactam-12

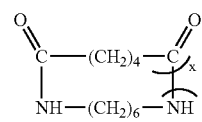

X = 1: nylon 66 unimer. X = 2: nylon 66 dimer

Some examples of suitable cyclic amides containing at least one aromatic ring are:

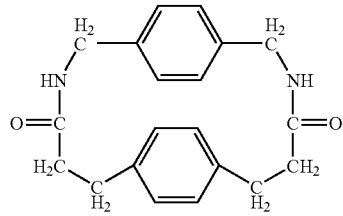

Tm = 208° C.

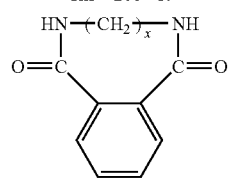

| x | Tm, ° C. |
|---|---|
| 2 | 178 |
| 4 | 171 |
| 6 | 224 |

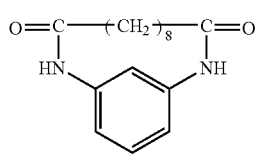

Tm = 245° C.

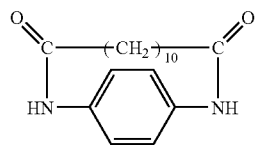

Tm = 208° C.

Cyclic amides can also be obtained through extraction from linear polyamides such as nylon 6 and nylon 66, for example, with ethanol, and analyzed by gas chromatography (see, e.g., S. Mori, M. Furusawa, and T. Takeuchi, Analytical Chemistry (1970), 42(6), 661-662).

It is also within the scope of the invention to employ cyclic co-amides or a mixture of at least two different cyclic amides to produce copolyamides. Therefore, unless otherwise stated, an embodiment of a composition, article or process that refers to cyclic amides also equally includes embodiments utilizing cyclic co-amides and embodiments utilizing a mixture of at least two different cyclic amides.

In one embodiment of the present invention, the N-heterocyclic carbene-containing catalyst is a compound of the formula

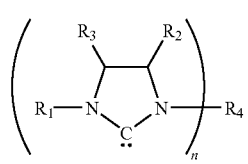

(I)

wherein:
$R_1$ is an adamantyl, alkyl, or cycloalkyl group;
$R_2$ and $R_3$ are each independently hydrogen or a $C_{1-12}$ alkyl group;
n equals 1 or 2; and
$R_4$ equals $R_1$ when n equals 1, and is an alkylene group when n equals 2.

Preferred are compounds in which $R_1$ is adamantyl, $R_2$ and $R_3$ are hydrogen, and $R_4=R_1$.

Non-limiting illustrative examples of the compound of Formula I are:

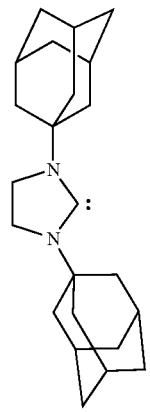

1,3-bis(1-adamantyl)-4,5-dihydroimidazol-2-ylidene and

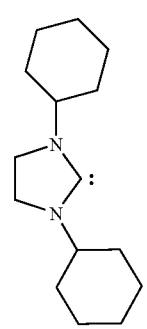

1,3-bis(cyclohexyl)-4,5-dihydroimidazol-2-ylidene.

In another embodiment of the present invention, the N-heterocyclic carbene-containing catalyst is a compound of the formula

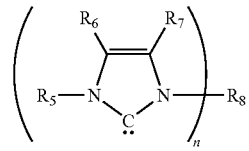

(II)

wherein
$R_5$ is an adamantyl, alkyl, or cycloalkyl group;
$R_6$ and $R_7$ are each independently hydrogen or a $C_{1-12}$ alkyl group;
n equals 1 or 2; and
$R_8$ equals $R_5$ when n equals 1, and is an alkylene group when n equals 2.

Preferred are compounds in which $R_5$ is adamantyl, $R_6$ and $R_7$ are hydrogen, and $R_8=R_5$.

Non-limiting illustrative examples of compounds of Formula (II) are:

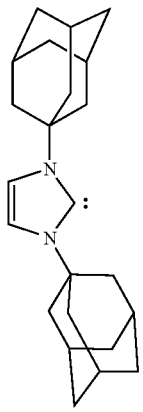

1,3-di-1-adamantyl-imidazole-2-ylidene and

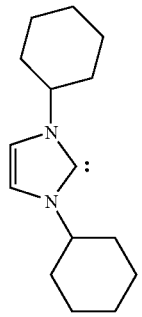

1,3-bis(cyclohexyl)-imidazol-2-ylidene

In yet another embodiment of this invention, the N-heterocyclic carbene-containing catalyst is a compound of the formula

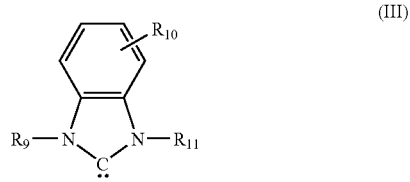

wherein
$R_9$ and $R_{11}$ are each independently an adamantyl or alkyl group, and
$R_{10}$ is hydrogen or a $C_{1-12}$ alkyl group.

Preferred are compounds in which $R_9=R_{11}$=adamantyl and $R_{10}$ is hydrogen.

Carbenes specified by structure (III) are described in Cetinkaya, E.; Hitchcock, P. B.; Kuecuekbay, H.; Lappert, M. F. ; Al-Juaid, S.; J. Organometallic Chemistry (1994), 481, 89-95; and in Teles, J. H.; Melder, J.-P.; Ebel, K.; Schneider, R.; Gehrer, E.; Harder, W.; Brode, S.; and Enders, D.; Breuer, K.; Raabe, G.; Helvetica Chimica Acta (1996), 79(1), 61-83.

The polymerization reaction is carried out at an elevated temperature, at which the cyclic amide is molten, by heating to the temperature at which the polymerization occurs. This is typically in the range of about 190 to about 280° C. The cyclic amide is heated to above its melting point so it becomes less viscous and can be manipulated more easily in processing. Stirring may be employed under an inert atmosphere.

An initiator may also be present, such as aliphatic amines or alcohols. The polymerization reaction may be carried out with or without a solvent. A solvent may be used to dissolve one or more of the reactants and/or to mix the reactants. A solvent may also be used as a medium in which the reaction is carried out. Illustrative solvents that may be used include high-boiling compounds such as o-dichlorobenzene and meta-terphenyl. In a preferred embodiment, no solvent is used in the polymerization reaction.

The amount of catalyst used is typically in the range of 1000 to 10,000 ppm by weight of the mixture formed with the cyclic amide that is used.

In one aspect of the invention, articles are produced using a cyclic amide material (with or without fillers) by polymerizing it in the process of forming the article, using processes including without limitation injection and rotational molding, resin film infusion, resin transfer molding, filament winding, powder coating to create a prepreg or film, hot melt prepreg preparation, compression molding, roll wrapping, and pultrusion; and all of these optionally with reinforcement. The only proviso is that conditions allow for the polymerization of the cyclic amide to form high molecular weight linear polyamide; that is, the cyclic amide should be heated at least to its melting point. Generally, most of such processes require that the resin to be processed have a low melt viscosity; therefore, cyclic amides, which have low melt viscosity are particularly suitable for such processing [see, e.g., A. Luisier, P.-E. Bourban, and J.-A. Månson, J. Polymer Science: Part A: Polymer Chemistry, Vol. 40, 3406-3415 (2002)].

For example, a molding process for manufacturing articles from cyclic amide includes placing in a mold at least one cyclic amide and at least one catalyst described by any of the Formulae I, II, or III, and heating the contents of the mold to a temperature high enough for polymerization of the cyclic amide to take place. This is above the melting point of the cyclic amide, typically in the range of about 190 to about 280° C. Molten cyclic amide and catalyst can be injected into the mold at much lower pressure than the 5,000 to 20,000 psi typical of injection molding processes because of the low viscosity of the molten cyclic amide.

In compression molding, the cyclic amide and catalyst(s) are placed between a top die and a lower die within a press. The cyclic amide and catalyst(s) are typically loaded onto a fibrous base material. The dies of the mold are pressed together with enough pressure to evenly fill the mold, and the mold contents are heated to a high enough temperature for polymerization to take place. Compression molding is used for making plastic composite parts that are thin and generally flat with mild features and contours such as truck and auto body panels, bumper beams, various trays and machine housings.

In rotational molding, the molding process additionally comprises rotating the mold about two axes simultaneously, so that the contents roll over the intended areas of the inside of the mold, beginning the rotation before the contents are heated, and continuing to rotate the mold until the content polymerizes and solidifies. Rotational molding is a process for making hollow thermoplastic articles, such as a wide variety of fluid storage tanks, tractor fenders and large children's toys.

In resin film infusion, a layer or film of the cyclic amide containing the catalyst(s) is placed in the mold adjacent to a dry layer of fibrous material, and, when the contents of the mold are heated, the cyclic amide and catalyst(s) are forced to infuse into the dry layer of fibrous material. Resin film infusion is a process for making plastic composite articles that are predominantly flat on one face and may have detailed features. An illustrative example of such articles is aircraft wing skins which are typically constructed of a composite made with carbon fiber and epoxy resin.

The compositions and methods of the invention may be used to manufacture articles of various size and shape from various cyclic amides. Exemplary articles that may be manufactured by the invention include without limitation automotive body panels and chassis components, bumper beams, aircraft wing skins, windmill blades, fluid storage tanks, tractor fenders, tennis rackets, golf shafts, windsurfing masts, toys, rods, tubes, bars stock, bicycle forks, and machine housings.

In the manufacture of an article, one or more of various types of fillers may be included. A particular filler often is included to achieve a desired purpose or property, and may be present in the resulting linear polyamide. For example, the purpose of the filler may be to increase the strength of the polyamide product. Boron nitride is used as a filler in applications that require high levels of heat conductivity and low levels of electrical conductivity. A filler also may provide or provide weight or bulk to achieve a particular density, be a substitute for a more expensive material, and/or provide other desirable properties as would be recognized by the artisan.

Illustrative examples of fillers are, among others, fumed silica, titanium dioxide, calcium carbonate, chopped fibers, fly ash, glass microspheres, micro-balloons, crushed stone, nanoclay, linear polymers, and monomers. A filler may be added before, during or after the polymerization reaction. The filler is added generally in an amount between about 0.1% and 70% by weight of the total weight (i.e., cyclic amide plus catalyst plus filler plus any other additives that may be present), depending on the filler and the purpose for adding the filler. For example, the percentage is preferably between 25 wt % and 50 wt % by weight in the case of calcium carbonate, between 2 wt % and 5 wt % by weight in the case of nanoclays, and between 25 wt % and 70 wt % by weight in the case of glass microspheres. Fillers can be used to prepare polyamide composites.

Furthermore, in the manufacture of an article, additional components (e.g., additives) may be added. Illustrative additives include colorants, pigments, magnetic materials, anti-oxidants, UV stabilizers, plasticizers, flame retardants, lubricants, and mold releases.

Where a range of numerical values is recited herein, unless otherwise stated, the range is intended to include the endpoints thereof, and all integers and fractions within the range. It is not intended that the scope of the invention be limited to the specific values recited when defining a range.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

The meaning of abbreviations is as follows: "min" means minute(s), "g" means gram(s), "mg" means milligram(s), "mmol" means millimole(s), "$M_n$" means number average molecular weight, "$M_w$" means weight average molecular weight, and "GPC" means gel permeation chromatography.

Experimental

Materials.

Caprolactam (CAS 105-60-2) was obtained from Aldrich Chemical Company (Milwaukee, Wis.) and was used as received. The cyclic dimer of nylon 66 ("CN66") was a byproduct of commercial nylon 66 manufacture and was provided by E.I. du Pont de Nemours & Co. (Wilmington, Del.) and recrystallized from hot methanol.

A cyclic amide unimer isolated from the reaction of dimethyl adipate and 2,2'-(ethylenedioxy-bis(ethylamine) in toluene using a lipase enzyme (Chirazyme L-2, c-f., C2, lyo.) was used in Examples 7 and 8. This enzymatic preparation is more particularly described in commonly-assigned U.S. Provisional Application No. 60/626,222, which is incorporated in its entirety as a part hereof for all purposes.

The N-heterocyclic carbenes were prepared as described in M. Niehues, G. Kehr, G. Erker, B. Wibbeling, R. Frohlich, O. Blacque, H. Berke, J. Organometallic Chem., 2002, Vol. 663, pp. 192-203; in W. A. Herrmann, C. Kocher, L. J. Goozen, and G. R. J. Artus, Chem. Eur. J. 1996, p. 1627; and in A. J. Arduengo, III, R. Krafczyk, R. Schmutzler, H. A. Craig, J. R. Goerlich, W. J. Marshall, M. Unverzagt, Tetrahedron, 1999, Vol. 55, pp. 14523-14534.

Polymer Characterization.

A size exclusion chromatography system comprised of a Model Alliance® 2690 from Waters Corporation (Milford, Mass.), with a Waters® 410 refractive index detector (DRI) and Viscotek Corporation (Houston, Tex.) Model T-60A dual detector module incorporating static right angle light scattering and differential capillary viscometer detectors was used for molecular weight characterization. The mobile phase was 1,1,1,3,3,3-hexafluoro-2-propanol (HFIP) with 0.01 M sodium trifluoroacetate The dn/dc was measured for the polymers and it was assumed that all of the sample was completely eluted during the measurement.

Example 1

A vial containing a mixture of 1 g of caprolactam and 50 mg of 1,3-di-1-adamantyl-imidazole-2-ylidene was placed in a 170° C. hot block. It remained there for 15 min. The temperature setting was then increased to 200° C. After the new temperature was set, the vial was left in the hot block for 15 more minutes. The temperature setting was then increased to 250° C., and the vial was left in the hot block for 15 additional minutes. GPC analysis indicated $M_n$=24,300 and $M_w$=43,700, with 50% conversion.

Example 2

A vial containing a mixture of 50 mg of 1,3-di-1-adamantyl-imidazole-2-ylidene and 500 mg of caprolactam was heated in a 200° C. hot block for 60 min. GPC analysis indicated $M_n$=37,100 and $M_w$=61,400, with 84% conversion.

Example 3

A vial containing a mixture of 21 mg of 1,3-bis(cyclohexyl)-imidazol-2-ylidene and 1.127 g of caprolactam was placed in a 200° C. hot block for 40 min. GPC analysis indicated $M_n$=48,200 and $M_w$=90,200, with 11% conversion.

Example 4

A vial containing a mixture of 18 mg 1,3-bis(1-adamantyl)-4,5-dihydroimidazol-2-ylidene and 0.996 g of caprolactam was placed in a 200° C. hot block for 65 min, then heated at 210° C. for about 30 min, then heated at 230° C. for 20 min and then at 250° C. for 30 min. GPC analysis indicated $M_n$=55,200 and $M_w$=77,900, with 8% conversion.

Example 5

A vial containing a mixture of 1.024 g of cyclic dimer of nylon 66 (4.4 mmol) with 10 mg of 1,3-bis(1-adamantyl)-4,5-dihyroimidazol-2-ylidene (0.029 mmol) was heated in a hot block at 270° C. for a total of 60 minutes. GPC analysis indicated Mn of 18,000 and Mw of 29,700 with 51% conversion.

Example 6

A vial containing 5 g of a 1:1 molar ratio mixture of caprolactam and CN66 and 90 mg of 1,3-di-1-adamantyl-imadazole-2-ylidene was heated in a hot block at 220° C. for 1 hr. GPC analysis indicated $M_n$ of 13400 and $M_w$ of 17200, with 33% percent conversion.

Example 7

The cyclic amide isolated from the reaction of dimethyl adipate and 2,2'-(ethylenedioxy-bis(ethylamine) in toluene using a lipase enzyme (Chirazyme L-2, c-f., C2, lyo.) was used in this example. A mixture of 506 mg of this cyclic amide and 8 mg of 1,3-bis(1-adamantyl)-4,5-dihyroimidazol-2-ylidene was heated for 10 min in a hot block at 180° C. then 10 min at 220° C., and then 10 min at 270° C. GPC analysis indicated Mn=10,800, Mw and 15,500, with 29% conversion.

Example 8

A mixture of 0.170 g (1.5 mmoles) of caprolactam, 0.387 g (1.5 mmoles) of the cyclic amide described in Example 7 and 25 mg of 1,3-di-1-adamantyl-imidazole-2-ylidene was heated in a hot block for 15 min at 170° C., then 15 min at 200° C., and then 15 min at 250° C. GPC analysis indicated Mn=6740 and Mw=8620, with 30% conversion.

What is claimed is:

1. A process for preparing a linear polyamide comprising contacting at least one cyclic amide with at least one N-heterocyclic carbene-containing catalyst described by the formula:

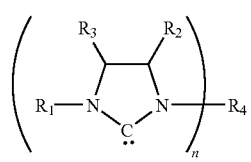

(I)

wherein:
$R_1$ is an adamantyl, alkyl, or cycloalkyl group;
$R_2$ and $R_3$ are each independently hydrogen or a $C_{1-12}$ alkyl group;
n equals 1 or 2; and
$R_4$ equals $R_1$ when n equals 1, and is an alkylene group when n equals 2.

2. A process for preparing a linear polyamide comprising contacting at least one cyclic amide with at least one N-heterocyclic carbene-containing catalyst described by the formula:

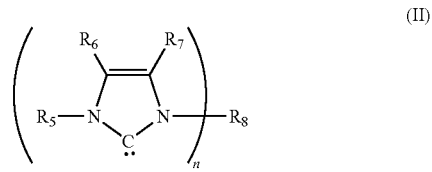

(II)

wherein
$R_5$ is an adamantyl, alkyl, or cycloalkyl group;
$R_6$ and $R_7$, are each independently hydrogen or a $C_{1-2}$ alkyl group;
n equals 1 or 2; and
$R_8$ equals $R_5$ when n equals 1, and is an alkylene group when n equals 2.

3. A process for preparing a linear polyamide comprising contacting at least one cyclic amide with at least one N-heterocyclic carbene containing catalyst described by the formula:

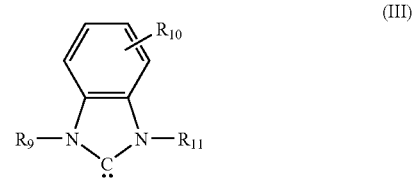

(III)

wherein
$R_9$ and $R_{11}$ are each independently an adamantyl, alkyl, or cycloalkyl group; and
$R_{10}$ is hydrogen or a $C_{1-12}$ alkyl group.

4. The process of claim 1, 2 or 3 which is carried out at about 190 to about 280° C.

5. The process of claim 1, 2 or 3 wherein the cyclic amide is contacted with the carbene containing catalyst in the presence of a filler.

6. The process of claim 5 wherein the filler is 0.1 to 70 wt % of the total weight of cyclic amide plus catalyst plus filler plus any other additives present.

7. The process of claim 5 wherein the filler is at least one member of the group consisting of boron nitride, fumed silica, titanium dioxide, calcium carbonate, chopped fibers, fly ash, glass microspheres, micro-balloons, crushed stone, nanoclay, linear polymers, and monomers.

8. A process for manufacturing an article from a cyclic amide, comprising the steps:
(a) providing to a mold at least one cyclic amide, and any one or more catalysts as described in claims 1, 2 or 3, and
(b) heating the contents of the mold to a temperature at which polymerization of the cyclic amide occurs.

9. The process of claim 8 wherein the cyclic amide is molten and is injected into the mold.

10. The process of claim 8 further comprising the step of rotating the mold about two axes simultaneously, so that the contents roll over the intended areas of the inside of the mold, beginning the rotation before the contents are heated, and continuing to rotate the mold until the content polymerizes and solidifies.

11. The process of claim 8 wherein a layer or film of the cyclic amide comprising the catalyst(s) is placed in the mold adjacent to a dry layer of fibrous material, and, when the contents of the mold are heated, the cyclic amide and catalyst(s) are forced to infuse into the dry layer of fibrous material.

12. The process of claim 8 wherein the mold contains a fibrous preform, and the cyclic amide and catalyst(s) are forced into the preform.

13. The process of claim 8 wherein the cyclic amide and catalyst(s) are placed between a top die and a lower die within a press, and the dies of the mold are pressed together to evenly fill the mold with the cyclic amide and catalyst (s).

14. A process for forming a prepreg from a cyclic amide and a polymerization catalyst comprising the steps:
 (a-1) dissolving at least one cyclic amide and any one or more catalysts as described in claims 1, 2 or 3 in a solvent to form a solution;
 (a-2) contacting the solution with a fibrous base material; and
 (a-3) removing the solvent; or
 (b-1) providing a release base material;
 (b-2) coating thereon a layer of at least one cyclic amide and any one or more catalysts as described in claims 1, 2 or 3; and
 (b-3) pressing the release base material against a fibrous base material under heat; or
 (c-1) providing at least one cyclic amide and any one or more catalysts as described in claims 1, 2 or 3 as a powder;
 (c-2) impregnating a coating of the powder of step c-1 into a fibrous base material;
 (c-3) softening the cyclic amide; and
 (c-4) applying heat and pressure to cause the cyclic amide to flow and polymerize in the fibrous base material.

15. The process of claim 14 wherein the fibrous base material is a fabric, fiber tow, or unidirectional prepreg tape.

16. A pultrusion process for making a fiber reinforced article, comprising the steps:
 a. providing at least one cyclic amide and any one or more catalysts as described in claims 1, 2 or 3;
 b. pulling a fibrous strand into an elongated die;
 c. causing the cyclic amide and the catalyst(s) to contact with and around the fibrous strand in the die;
 d. heating to cause polymerization of the cyclic amide forming a high molecular weight linear polyamide resin matrix around the fibrous strand; and
 e. pulling the linear polyamide matrix into an exit portion of the die having a desired cross section thereby forming an article.

17. The process of claim 16 wherein the cyclic amide is continuously melted outside the die and pumped into the die in liquid form.

18. A filament winding process for manufacturing hollow plastic composite articles from cyclic amides, comprising the steps:
 a. providing at least one cyclic amide and any one or more catalysts as described in claims 1, 2 or 3;
 b. contacting the cyclic amide and the polymerization catalyst(s) with a fibrous strand;
 c. winding the fibrous strand onto a mandrel; and
 d. heating the cyclic amide to a temperature at which polymerization thereof occurs.

19. A roll wrapping process for manufacturing tubular articles from cyclic amides, comprising the steps:
 a. forming a prepreg by impregnating a sheet or tape of reinforcing fibers with at least one cyclic amide and any one or more catalysts as described in claims 1, 2 or 3;
 b. rolling the prepreg onto a mandrel; and
 c. heating the cyclic amide to a temperature at which polymerization thereof occurs.

20. The process of claims 8 wherein at least one filler is present in contact with the cyclic amide.

21. The process of claim 20 wherein the weight of the filler is 0.1 to 70% of the total weight of the cyclic amide plus catalyst plus filler plus any other additives present.

22. The process of claim 20 wherein the filler is at least one member of the group consisting of boron nitride, fumed silica, titanium dioxide, calcium carbonate, chopped fibers, fly ash, glass microspheres, micro-balloons, crushed stone, nanoclay, linear polymers, and monomers.

23. The process of claim 16 wherein at least one filler is present in contact with the cyclic amide.

24. The process of claim 18 wherein at least one filler is present in contact with the cyclic amide.

25. The process of claim 19 wherein at least one filler is present in contact with the cyclic amide.

* * * * *